United States Patent
Malfait et al.

(10) Patent No.: US 7,354,635 B2
(45) Date of Patent: Apr. 8, 2008

(54) PEELABLE SEAL FILM

(75) Inventors: Tony Malfait, Rollegem-Kapelle (BE);
Patrick Rosseau, Grimbergen (BE);
Erik Bogels, Lanaken (BE); Luc Veys,
Ghent (BE)

(73) Assignee: Amcor Flexibles Transpac (BE)

( * ) Notice: Subject to any disclaimer, the term of this patent is extended or adjusted under 35 U.S.C. 154(b) by 0 days.

(21) Appl. No.: 10/494,102

(22) PCT Filed: Oct. 22, 2002

(86) PCT No.: PCT/EP02/11902

§ 371 (c)(1),
(2), (4) Date: Apr. 30, 2004

(87) PCT Pub. No.: WO03/043816

PCT Pub. Date: May 30, 2003

(65) Prior Publication Data

US 2005/0008802 A1 Jan. 13, 2005

(30) Foreign Application Priority Data

Nov. 20, 2001 (EP) .................................. 01870249

(51) Int. Cl.
*B32B 27/08* (2006.01)
(52) U.S. Cl. ............... 428/35.7; 428/475.8; 428/476.3; 428/483; 428/511; 428/515; 428/517; 428/518; 428/520; 525/70; 525/240; 525/241
(58) Field of Classification Search ................ 428/35, 428/7, 475.8, 476.3, 483, 511, 515, 517, 518, 428/520; 525/70, 240, 241
See application file for complete search history.

(56) References Cited

U.S. PATENT DOCUMENTS

| 4,367,312 A | * | 1/1983 | Bontinck et al. ............. 525/93 |
| 5,281,453 A | * | 1/1994 | Yamada et al. ............ 428/35.7 |
| 6,080,456 A | | 6/2000 | Fonteyne ................... 428/35.7 |

FOREIGN PATENT DOCUMENTS

EP 0 024 270 2/1981

* cited by examiner

*Primary Examiner*—D. S Nakarani
(74) *Attorney, Agent, or Firm*—McDonnell Boehnen Hulbert & Berghoff LLP

(57) ABSTRACT

The present invention is related to a heat sealable coextruded multilayer packaging film peelable on a variety of substrates including polyethylene, polypropylene, polyester, polyvinyl chloride, polyamide, polyacrylonitirle and paper, comprising at least one peelable layer from a pre-compounded precursor formulation containing: −50 to 80% by weight of an ethylene homo and/or copolymer, −15 to 25% by weight of a styrene homo or/and copolymer, −5 to 20% by weight of a thermoplastic elastomeric styrene-butadiene-styrene block copolymer, characterised in that the peel force in said peelable seal film produced by said pre-compounded precursor is modified by the presence in said precursor in the final extrusion step of 5 to 25, and preferably 10 to 20% by weight of homogeneously branched LLDPE and/or polybutene-1.

9 Claims, 2 Drawing Sheets

PEELABLE SEAL FILM

FIELD OF THE INVENTION

The present invention is related to a multilayer thermosealable coextruded film producing a peelable tamper evident sealing joint with low peeling forces and in particular to packagings comprising said films. Furthermore a process for manufacturing said peelable seal films is disclosed.

STATEMENT OF THE PROBLEM AND STATE OF THE ART

In the last decades, various peel/seal combinations for packaging films have been developed. For high quality peel film applications, the quality criteria are extremely selective and the opening force should be considerably lower than the internal cohesion force of the peeling film and the substrate supporting this film in order to avoid delamination. Furthermore, the peel strength has to be operable over a broad heat seal temperature window especially for full automised packing lines where the sealing speed is of a major importance.

The document EP0024270, describes in 1980 a heat sealable packaging monolayer film producing a peelable seal for a wide range of packaging films. This document discloses a composition comprising ethylene polymer, polystyrene and a thermoplastic elastomer based on styrene-butadiene-styrene or styrene-butadiene-styrene in a monolayer film which is heat sealed on a variety of substrates including polyethylene, polypropylene polyester, polyvinylchloride, polyamide, polyacrylonitrile and paper.

This type of packaging peal film does not any longer respond to the request of modern coextruded multilayer films which requests properties like inclusions of oxygen barriers or tear free peelable film/paper combinations, tamper evidence, a broad cohesive peel-seal window, sterilisability by irradiation or ethylene oxide and hottack.

In particular, for medical applications, the peel film is required to be tamper evident and the cohesive failure mechanism during opening of the packaging has to occur without zipping, fibre tear or angel hairs. This means that the peel trace should be smooth and exempt from all kind of visual disruptions. Furthermore, the film must be peelable on various substrates including polyester, polyvinyl chloride and polyamide.

In order to meet these criteria, the different incompatible polymers in the peel blend composition have to be highly dispersed and homogenized during an extrusion compounding step. A high level of shear leading to high dispersion, can for example be reached by blending the components in a twin screw extruder during a pre-compounding session.

The problem however of an industrial off-line compounding operation is mainly economical and the high output rates of the actual compounding machinery, a few tons per hour, requires large volumes.

The large scale operation of this step inevitably restricts the flexibility required for smaller orders of e.g. divers specific tailor-made peel products. The challenge of the present invention was therefore to find a solution to this problem, without the need to invest in expensive in-line compounding equipment.

EP-A-0 0240 270 discloses a packaging film, suitable for lamination on supports for the packaging of articles that has to be sterilised according to U.S. Pat. No. 6,080,456. Both documents do not disclose the use of a homogeneously branched LLDPE and/or polybutene-1 as in the final extrusion step of the present invention for the fine tuning of the peel force as it will be presented in the following description.

AIMS OF THE INVENTION

The present invention aims to provide a method for the production of a tailor-made peelable seal film, eventually with improved hottack properties, by means of the modification of a pre-compounded formulation in a final extrusion step, and in particular for high quality packaging applications with very selective criteria.

SUMMARY OF THE INVENTION

This invention relates to a heat sealable coextruded multilayer packaging film peelable on a variety of substrates including polyethylene, polypropylene, polyester, polyvinyl chloride, polyamide, polyacrylonitrile and paper, comprising at least one peelable layer from a pre-compound precursor formulation containing 50 to 80% by weight of an ethylene homo and/or copolymer, 15 to 25% by weight of a styrene homo or/and copolymer, 5 to 20% by weight of a thermoplastic elastomeric styrene-butadiene-styrene block copolymer characterised in that, the peel force in said peeable seal film produced by said pre-compounded precursor is modified by the addition to said precursor in the final extrusion step of 5 to 25, and preferably 10 to 20% by weight of homogeneously branched LLDPE.

A key aspect of the present invention is that the amount of the pre-compounded precursor formulation represents 70 to 90% by weight referred to the total weight of the polymers present in the peelable layer. The total weight of the film contains up to 4% by weight of process additives selected from the group consisting of fluorine elastomers in the peelable layer.

Another key aspect of the present invention is that the peel layer in the coextruded multiplayer film can be situated on the surface or inside of the multilayer complex for peel applications and represents maximum 15% of the total thickness of the multilayer film.

An additional aspect of the present invention discloses a process for the preparation of a heat sealable and peelable coextruded multilayer packaging film characterised in that a precursor formulation for the peelable layer as defined in claim 1 is pre-compounded, in a first step, in a high shear and dispersing extrusion equipment, in that said pre-compounded precursor formulation is than extruded in a second step through a single screw extrusion equipment while adding homogeneously branched LLDPE or polybutene-1 to modify the peel force and the hottack of the packaging film.

It is particularly surprising and unexpected that such high levels than 25% by weight of LLPDE could be perfectly dispersed among the precursor formulation in a single screw equipment in the second extrusion step. This proves a perfect compatibility with the precursor formulation.

A further aspect of the present invention is that the surface area of said film is optically modified by applying an external nip pressure and temperature during the manufacturing.

The film obtained by the present invention is used for peel against paper, and for sterilisable and tamper evident packaging applications.

SHORT DESCRIPTION OF THE DRAWINGS

DETAILED DESCRIPTION OF THE INVENTION

Figure 1:
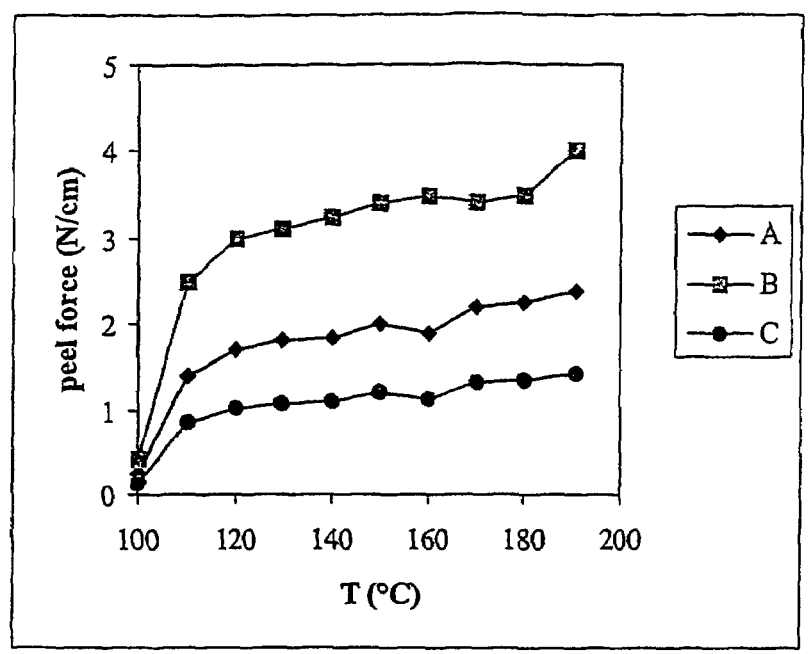
FIG. 1 represents a plot of a peel seal curve of the 50 μm coextruded formulation (A) and a 10% homogeneously branched LLDPE containing formulation (B) and a 10% PB1-containing formulation (C) versus sealing temperature on the abscissa. Sealing: untreated peel side against itself.
Figure 2:
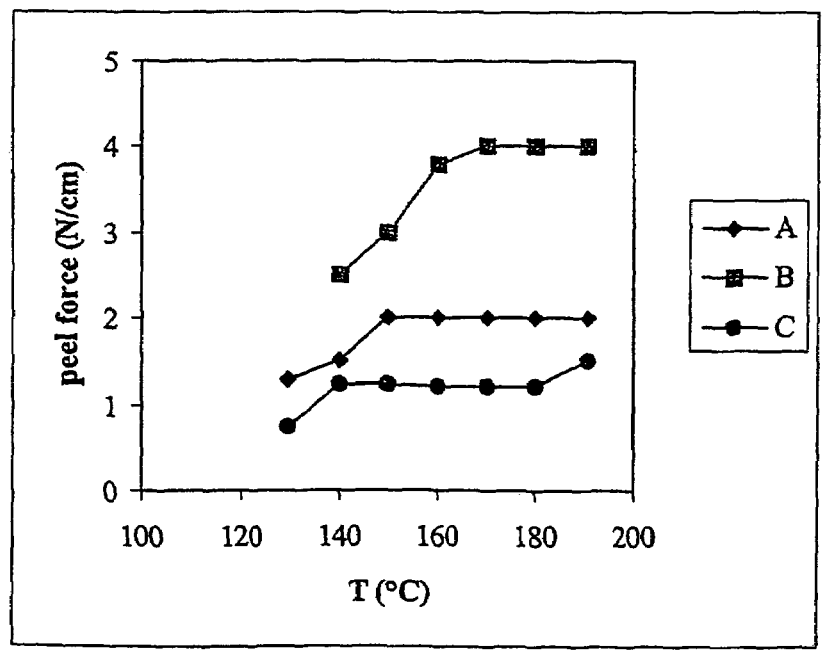
FIG. 2 represents a plot of a peel seal curves of the 50 μm coextruded formulation (A), a 10% homogeneously branched LLDPE containing formulation (B) and a 10% PB1-containing formulation (C) versus sealing temperature on the abscissa. Sealing: corona treated peel side against 300 μm PVC as peel layer support.
Figure 3:
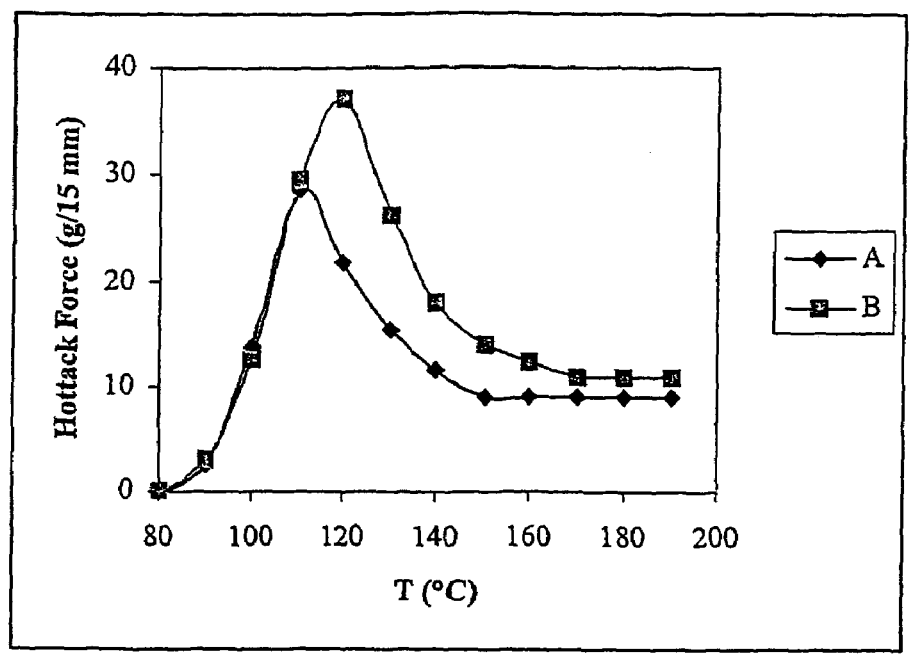
FIG. 3 represents hottack-curves of the 50 μm coextruded formulation (A) and a 10% homogeneously branched LLDPE containing formulation (B).
Figure 4:
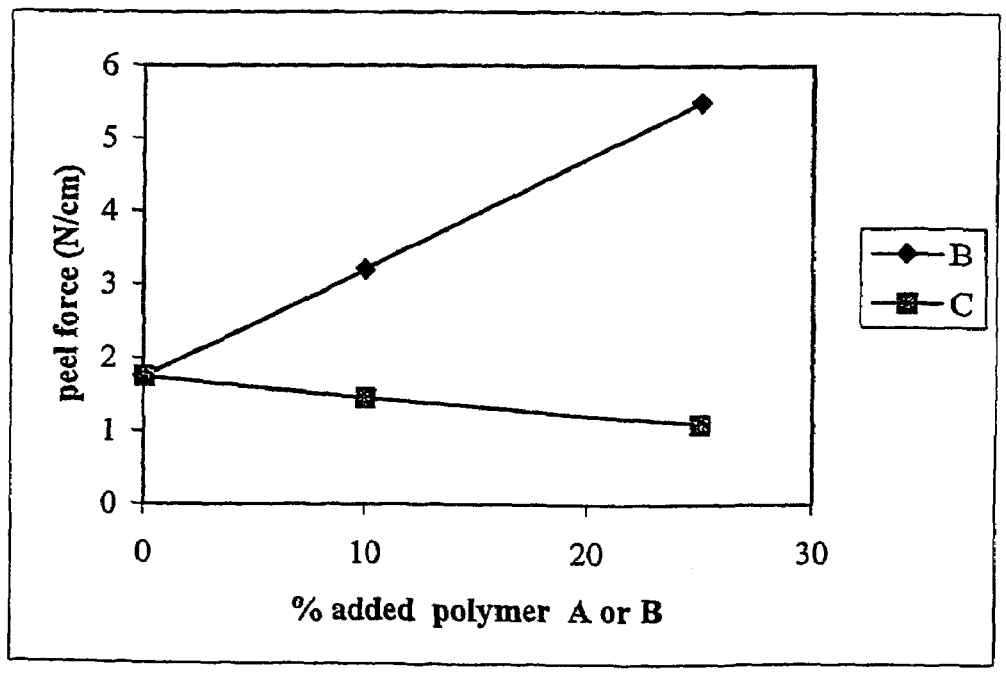
FIG. 4 represents the effect of adding homogeneously branched LLDPE (B) and PB-1 (C) on the peel force of the 50 μm coextruded precursor formulation. Sealing at 140° C.: untreated peel side against itself.

The idea of the present invention was to develop one standard pre-compounded formulation compoundable in high volumes and use it as the precursor of the final peelable seal film.

During the final film extrusion this particular formulation can then be rapidly tuned towards the specific customers needs by adding additional components not present in the pre-compounded formulation. In this way, the peel forces and hottack properties of a pre-compound precursor formulation can be adjusted during the final film extrusion step without changing the composition of the mixture that has to be pre-extruded.

More specifically by direct blending of homogeneously branched LLDPE into a pre-compounded precursor formulation during film extrusion, both lower and higher peel forces and higher hottack can be given to the peel seal film without a loss of essential peel-seal properties as tamper evidence, cohesive fracture, smooth peel trace, no zipping and fiber tear and peelability on the various substrates including polyester, polyvinyl chloride, polyamide, polyacrylonitrile and paper.

DESCRIPTION OF A PREFERRED EMBODIMENT OF THE INVENTION

Various formulations have been extruded and tested according to the conditions described below. Usual film single-screw extrusion equipment is unable to disperse homogeneously a precursor as described in formulation A. Consequently this step has to be performed on compounding extrusion equipment as for example a double screw extrusion equipment. It was unexpected that the LLDPE and the PB-1 could be homogenised during a second single screw extrusion step.

Formulation A

This formulation is an example of the pre-compounded precursor formulation:
62% of polyethylene (LDPE)
20% of polystyrene (PS)
13% of styrene-butadiene-styrene (SBS)
2.5% of fluorine elastomer or polymer based masterbatch
2.5% of antioxidant based masterbatch Examples of Raw Materials for the Precursor Formulation

LDPE

Escorene LD150BW (Exxon Mobil, $\rho=0.923$, MI=0.923), Lacqtène (Atofina, $\rho=0.923$, MI=0.3), Novex LD5307AA (BP Chemicals, $\rho=0.921$, MI=0.7).

PS

Lacqrene 1240 (Atofina, MI=2), Lacqrene 1320 (MI=3.5).

SBS

Finaprene 411 (Atofina, MI<0.5, butadiene/styrene 69/31), Finaprene 417 (Atofina, MI=1.7, butadiene/styrene 71/29).

Fluorine Elastomer or Polymer Based Masterbatch
Ampacet 10562-A (PE-carrier)
Schulman AMF 705 (PE-carrier)

Antioxidant Based Masterbatch
Ampacet 10886 (PE-carrier)
Schulman AO 25 (PE-carrier)

This formulation is introduced in a second step in a single screw film coextrusion equipment. The following formulations (B and C) only concern the peelable layer of the coextruded multilayer complex.

Formulation B

This is the modification targeting an increased peel force and a better hottack behaviour.

Formulation B=Formulation A+5 to 25% by weight of homogeneously branched LLDPE. Examples of such LLDPE are:

Exact 0203 (Dex Plastomers, $\rho=0.902$, MI=3.0), Exceed 2518 CB (ExxonMobil, $\rho=0.918$, MI=2.5), Evolue SP2020 (Mitsui, $\rho=0.916$, MI=1.5), mPact D143 (Phillips Petroleum ($\rho=0.916$, MI=1.3)

Formulation C

This is the modification targeting a decreased peel force.
Formulation C=Formulation A+5 to 25% polybutene-1.
Examples of such polybutene-1 are:
PB8340 (Basell, $\rho=0.908$, MI=4.0), PB8310 (Basell, $\rho=0.895$, MI=3.0), Tafmer BL3110 (Mitsui, $\rho=0.910$, MI=1.0), Tafmer BL4000 (Mitsui, $\rho=0.915$, MI=1.8)

The experimental peel force values observed on the extruded films depends on the measurement conditions and therefore have to be compared to each other under the same experimental conditions. This is the reason why the formulations A, B and C are represented on the same graphs.

Experimental Sealing Conditions

Sealing curves, peel against peel and against 300 μm PVC, were performed with a Kopp sealer. The upper jaw was heated while the lower contained a 60 shore A rubber at room temperature. Sealing was performed at 2 bar pressure with a dwell time of 1 second. Peel forces were measured at a 90° peel angle. Prior to the peel seal test the 50 μm films were laminated against 19 μm OPET to avoid elastic effects which gives results better related to the reality.

Hottack Measurements

Hottack is measured with a DTC hottack tester. The 50 μm films were laminated against 19 μm OPET and sealed during 0.5 sec at a pressure of 5 bar. The heated jaws were opened after 0.1 sec of sealing.

The optical quality of the peelable film can be modified during the extrusion step by applying various nip pressures or temperatures.

The invention claimed is:

1. A peelable seal film layer formed from a pre-compounded precursor formulation containing:
   – 50 to 80% by weight of an ethylene homo and/or copolymer,
   – 15 to 25% by weight of a styrene homo and/or copolymer,
   – 5 to 20% by weight of a thermoplastic elastomeric styrene-butadiene-styrene block copolymer, wherein said peelable layer further comprises 5 to 25% by weight of homogeneously branched LLDPE in order to modify the peel force in said peelable seal layer.

2. The peelable seal film of claim 1, wherein the amount of the pre-compounded precursor formulation represents 70 to 90% by weight referred to the total weight of the polymers present in the peelable layer.

3. The peelable seal film of claim 1, wherein said film contains up to 4% by weight of process additives selected from the group consisting of fluorine elastomers in the peelable layer.

4. A sterilisable package including a peelable seal film layer of claim 1.

5. A tamper evident package including a peelable seal film layer of claim 1.

6. Packagings comprising a peelable seal film layer as in claim 1.

7. The peelable seal film of claim 1 wherein the peelable seal film is applied to a substrate is selected from the group of substrates consisting of polyethylene, polypropylene, polyester, polyvinyl chloride, polyamide, polyacrylonitrile and paper.

8. Process for the preparation of a peelable seal film comprising the steps of:

forming a pre-compounded precursor formulation containing:
      50 to 80% by weight of an ethylene homo and/or copolymer,
      15 to 25% by weight of a styrene homo and/or copolymer,
      5 to 20% by weight of a thermoplastic elastomeric styrene-butadiene-styrene block copolymer, in a high shear and dispersing extrusion equipment; and extruding said pre-compound precursor formulation through a single screw extrusion equipment while adding 5 to 25% by weight homogeneously branched LLDPE to form a peelable seal film layer.

9. Process according to claim 8, wherein the surface area of said film is optically modified by applying an external nip pressure and temperature during the manufacturing.

* * * * *

UNITED STATES PATENT AND TRADEMARK OFFICE
CERTIFICATE OF CORRECTION

PATENT NO.        : 7,354,635 B2
APPLICATION NO. : 10/494102
DATED             : April 8, 2008
INVENTOR(S)       : Malfait et al.

It is certified that error appears in the above-identified patent and that said Letters Patent is hereby corrected as shown below:

At column 6, line 2, delete "is" which appears between the words "substrate" and "selected".

Signed and Sealed this

Fifteenth Day of July, 2008

JON W. DUDAS
*Director of the United States Patent and Trademark Office*